United States Patent
Goodwin (10) Patent No.: US 9,617,899 B2
(45) Date of Patent: Apr. 11, 2017

(54) METHODS AND SYSTEMS FOR A PARTICULATE MATTER SENSOR

(71) Applicant: Ford Global Technologies, LLC, Dearborn, MI (US)

(72) Inventor: William Russell Goodwin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 13/706,048

(22) Filed: Dec. 5, 2012

(65) Prior Publication Data

US 2014/0150406 A1 Jun. 5, 2014

(51) Int. Cl.
*F01N 3/00* (2006.01)
*F01N 11/00* (2006.01)
*F02D 41/14* (2006.01)
*F02D 41/22* (2006.01)

(52) U.S. Cl.
CPC ............ *F01N 11/007* (2013.01); *F01N 11/00* (2013.01); *F02D 41/1466* (2013.01); *F02D 41/1494* (2013.01); *F02D 41/222* (2013.01); *F01N 2550/04* (2013.01); *F01N 2900/1411* (2013.01); *Y02T 10/40* (2013.01); *Y02T 10/47* (2013.01)

(58) Field of Classification Search
CPC ............... F01N 11/001; F01N 11/0071; F02D 41/14661; F02D 41/14941; F02D 41/2221
USPC .................................. 60/274, 276, 277, 311
See application file for complete search history.

(56) References Cited

U.S. PATENT DOCUMENTS

| | | | |
|---|---|---|---|
| 6,432,168 B2 * | 8/2002 | Schonauer | 95/18 |
| 7,739,898 B2 | 6/2010 | Shaddock et al. | |
| 8,656,763 B2 * | 2/2014 | Yoshioka | 73/114.31 |
| 2003/0127077 A1 | 7/2003 | Sisken | |
| 2009/0301058 A1 * | 12/2009 | Boehler et al. | 60/276 |
| 2009/0301062 A1 * | 12/2009 | Sumida et al. | 60/285 |
| 2011/0146242 A1 * | 6/2011 | Kawase | 60/277 |
| 2011/0197571 A1 * | 8/2011 | Visser et al. | 60/311 |
| 2011/0232268 A1 | 9/2011 | Nelson | |
| 2011/0314796 A1 * | 12/2011 | Nakamura et al. | 60/276 |
| 2012/0031077 A1 * | 2/2012 | Aoki | 60/276 |
| 2012/0144813 A1 * | 6/2012 | Yahata et al. | 60/311 |
| 2012/0255340 A1 * | 10/2012 | Ante et al. | 73/23.31 |

FOREIGN PATENT DOCUMENTS

| | | | | |
|---|---|---|---|---|
| DE | 102007060939 A1 * | 6/2009 | ............ | G01N 15/06 |
| JP | 2010275977 A * | 12/2010 | | |
| JP | 2011256796 A | 12/2011 | | |

* cited by examiner

*Primary Examiner* — Thomas Denion
*Assistant Examiner* — Matthew T Largi
(74) *Attorney, Agent, or Firm* — Julia Voutyras; McCoy Russell LLP (57) ABSTRACT

Various systems and methods are described for a particulate matter sensor coupled to an exhaust system of an engine. One example method comprises, during a measurement mode, generating a particulate flow rate based on the sensor and adjusting one or more engine operating parameters based on the flow rate. The method further includes, during a reduced contamination mode, heating the sensor to repel particulate from the sensor, and not adjusting the one or more operating parameters based on the sensor.

21 Claims, 5 Drawing Sheets

METHODS AND SYSTEMS FOR A PARTICULATE MATTER SENSOR

TECHNICAL FIELD

The present application relates generally to a particulate matter sensor coupled to an exhaust system of an internal combustion engine.

BACKGROUND AND SUMMARY

Exhaust systems may include one or more particulate matter sensors to determine an amount of particulate matter (e.g., carbon contaminants such as soot) in an exhaust gas stream. In some examples, the particulate matter sensors may be resistive sensors with an exposed electrode on which the exhaust system particulate matter accumulates. The accumulated particle matter, gathered in sufficient quantity, causes a change in resistance. This change in resistance is used along with other powertrain operating parameters to infer a particulate matter leakage rate of the particulate filter. This leakage rate is compared to the allowable leakage rate of the powertrain system and is used to determine the health of the particulate filter. While this sensor is intended to measure small particle carbon based contaminants, other contaminants (e.g., non-carbon contaminants), such as oil additives, fuel contaminants, and residual materials from the exhaust system (e.g., iron oxide, etc.) may accumulate on the electrode. This contamination, if progressed sufficiently, results in decreased accuracy of the sensor and degrades an ability of the sensor to measure particulate matter leakage.

The inventor herein has recognized the possibility of excessive contaminant accumulation on the particulate sensor and a need for methods of protection from this contaminant exposure. A method is provided to allow for proper measurement of the particulate matter sensor while increasing the robustness of the sensor to normal contamination expected in the exhaust system. In the simplest implementation, the particulate matter sensor has three phases of operation: the first mode is a startup condition where the sensor is placed in an operational condition that limits the ability of liquid droplets to form on or damage the sensor ceramic substrate; the second mode is a normal measurement mode where the sensor performs and completes a normal measurement; and the third mode is a reduced contamination mode that allows for the sensor to be placed in an operational condition where the sensing element is put into a mode where potential contaminants are repelled from the sensing surface.

In one particular example, a method for a particulate matter sensor comprises generating an indication of particulate flow rate through a particulate filter based on particulate accumulation on a sensing element of the sensor. The method further comprises diagnosing the sensor based on the flow rate. The method further comprises, after diagnosing of the sensor is completed, heating a sensing element of the sensor to repel particulate from the sensing element. Thus, in one example, the sensor may diagnose the particulate filter during a measurement mode of operation. Further, the sensor may be heated to repel particulate, such as contaminants, during a reduced contamination mode of operation. The measurement mode and reduced contamination mode may be carried out at different times, for example. In this manner, while the sensor is not being used to generate information about the particulate filter, the sensor may be protected from accumulation of contaminants which may degrade performance of the sensor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods and systems for a particulate matter sensor. In one example, a method includes generating a particulate flow rate through a particulate filter based on particulate accumulation on a sensing element of the sensor, and diagnosing the sensor based on the flow rate. The method further comprises, after diagnosing the sensor is completed, heating a sensing element of the sensor to repel particulate from the sensing element. Thus, the sensor may be operated in a measurement mode to output information regarding the particulate filter and operated in a reduced contamination mode when the sensor is not diagnosing the particulate filter. During the measurement mode, one or more operating parameters of an engine, which has an exhaust system in which the sensor and particulate filter are coupled, may be adjusted based on the sensor output. In contrast, the engine operating parameters may not be adjusted during the reduced contamination mode. In this manner, the particulate sensor may provide diagnostics during part of a drive cycle of the engine (e.g., during measurement mode) and may experience decreased contamination during another part of the drive cycle (e.g., during reduced contamination mode).

Figure 1:
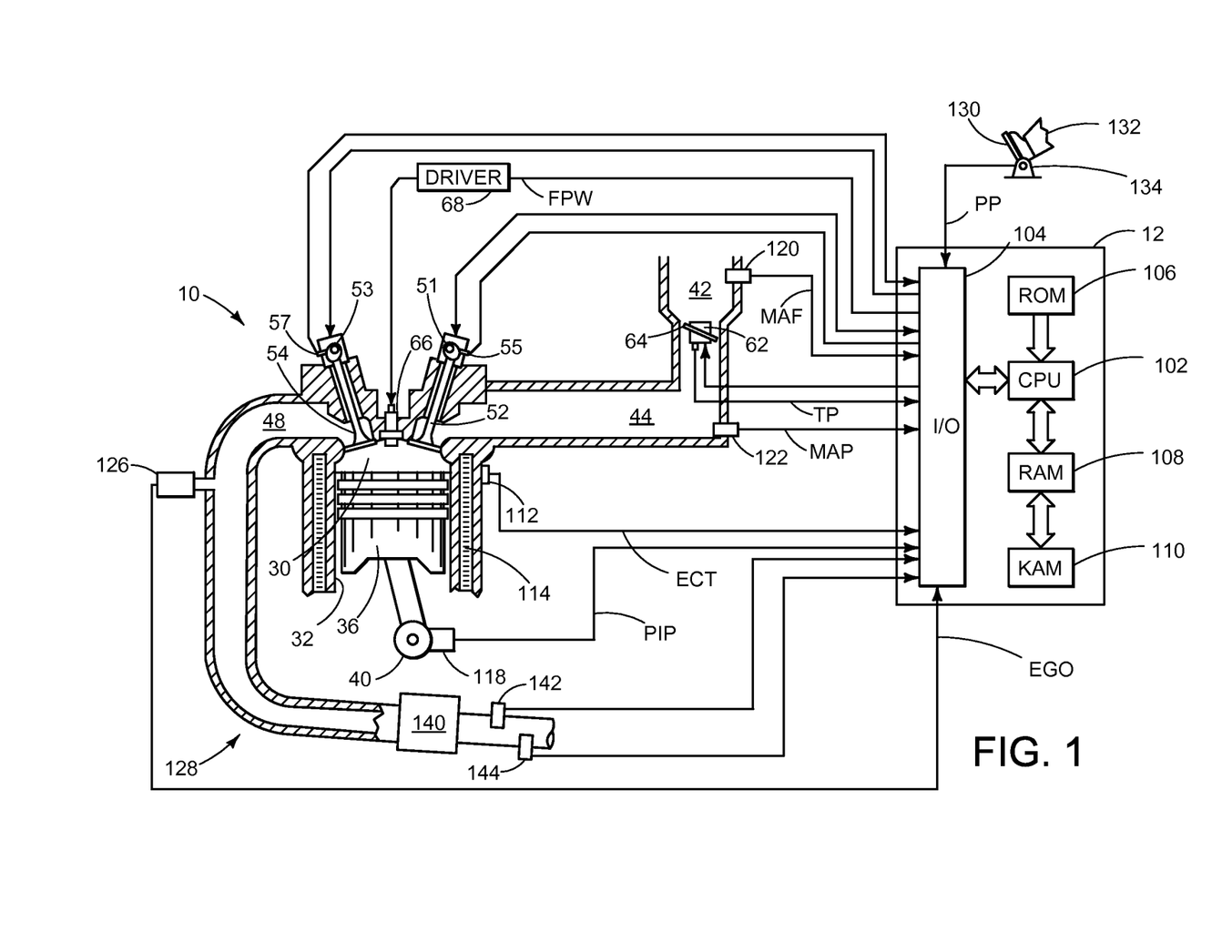
FIG. 1 shows a schematic diagram of an engine including an exhaust system and a particulate matter sensor.

Referring now to FIG. 1, a schematic diagram showing one cylinder of multi-cylinder engine 10, which may be included in a propulsion system of an automobile, is illustrated. The engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from the controller 12 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

In one example, the engine 10 is a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

An exhaust system 128 includes an exhaust gas sensor 126 coupled to the exhaust passage 48 upstream of an emission control device 146. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The emission control device 146 is shown arranged along the exhaust passage 48 downstream of the exhaust gas sensor 126. In the example shown in FIG. 1, the device 146 may be a three way catalyst (TWC), $NO_x$ trap, selective catalytic reduction system, various other emission control devices, or combinations thereof. In some embodiments, during operation of the engine 10, emission control device 146 may be periodically reset by operating at least one cylinder of the engine within a particular air/fuel ratio.

Further, the exhaust system 128 includes a particulate filter 140 disposed downstream of the emissions control device 146. The exhaust system 128 further includes a resistive particulate matter (PM) sensor 142 and a temperature sensor 144 positioned downstream of the particulate filter 140. As will be described in greater detail below, the PM sensor 142 may generate an indication of a flow rate of particulate matter through the particulate filter 140 during at least part of a drive cycle of the engine 10. The PM sensor 142 may be a heated sensor that is heated based on a temperature of the exhaust gas, for example. As such, the temperature sensor 144 is provided in the exhaust passage 48 to generate an indication of the exhaust gas temperature.

The controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may receive various signals from sensors coupled to the engine 10, in addition to those signals previously discussed, including measurement of inducted mass air flow (MAF) from a mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; and absolute manifold pressure signal, MAP, from the sensor 122. Engine speed signal, RPM, may be generated by controller 12 from signal PIP.

The storage medium read-only memory 106 can be programmed with non-transitory, computer readable data representing instructions executable by the processor 102 for performing the methods described below as well as other variants that are anticipated but not specifically listed.

In one example, the controller 12 may determine degradation of the particulate filter 140 based on output from the PM sensor 142. Once the diagnostic is complete, the PM sensor 142 may be operated in a reduced contamination mode in which the PM sensor 142 is heated to a temperature higher than an exhaust gas temperature indicated by the exhaust gas temperature sensor 144, but less than a temperature at which the particulate matter may burn. By heating the PM sensor 142 to a temperature high than that of the exhaust gas, particulate matter may be repelled from the PM sensor 142, thereby reducing build-up of contaminants on the PM sensor 142.

As described above, FIG. 1 shows only one cylinder of a multi-cylinder engine, and each cylinder may similarly include its own set of intake/exhaust valves, fuel injector, spark plug, etc.

Figure 2:
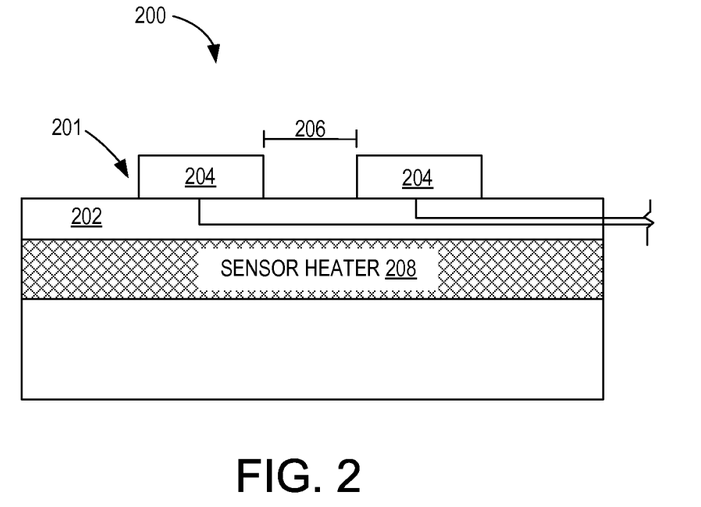
FIG. 2 shows a schematic diagram of an example particulate matter sensor.

Referring now to FIG. 2, a schematic view of an example embodiment of a PM sensor 200 is shown. The PM sensor 200 may be the PM sensor 142 described above with reference to FIG. 1 and, therefore, may share common features and/or configurations as those already described for the PM sensor 142. The PM sensor 200 may be configured to measure particulate matter mass and/or concentration in the exhaust gas, and/or a flow rate of particulate matter through a particulate filter positioned upstream of the PM sensor 200. As such, the PM sensor 200 may be coupled to an exhaust pipe. It will be appreciated that the PM sensor 200 is shown in simplified form by way of example and that other configurations are possible.

As shown, the PM sensor 200 includes a sensing element 201 which is exposed to an exhaust gas stream. The sensing element 201 includes a substrate 202 and two sensing electrodes 204. The substrate 202 is a ceramic substrate which provides mechanical support for the sensing electrodes 204 and electrical isolation material which separates the sensing electrodes 204. The substrate 202 is exposed to a flow of exhaust gas through the exhaust pipe in which the PM sensor 200 is inserted such that particulate matter accumulates on the substrate 202.

The two electrodes 204 may be positioned on, or in close proximity to, substrate 202. As shown, the two electrodes 204 may be separated by a small gap, indicated at 206. The electrodes 204 may be non-reactive platinum electrodes, for example, however it will be appreciated that the electrodes may be made of other suitable materials.

A PM sensor design such as that shown in FIG. 2 may lead to soot accumulation on the substrate 202 of the sensing element 201 to a point where a gap 206 is bridged by the accumulated soot. In such cases, the conductivity between the electrodes 204 drops from the nearly zero conductivity of the ceramic substrate. The conductance between the electrodes is therefore an indication of the cumulative particulate matter in the area of the exhaust that the sensor measures.

The PM sensor 200 contains an internal heater 208, which is utilized to heat the PM sensor 200 to a sufficient temperature, typically higher than 600° C., which is sufficiently high to oxidize the PM sensor 200 and to clean the electrodes 204 and the surface of the substrate 202 such that the sensing element is ready for a new measurement cycle. This heating mode is limited in maximum temperature and time, as the electrode materials may erode and thus change the transfer function of the sensor relative to soot accumulation. In the proposed reduced contamination mode, there would be an increase in a temperature of the PM sensor 200, but it would be less than the critical temperature and time such that the sensing electrodes 204 would not be degraded. In one example, the PM sensor 200 may be heated to a temperature just below 600° C. and well above the temperature of exhaust gas surrounding the PM sensor 200. As such, particulate matter (carbon based, such as soot, and non-carbon based) may be repelled from the PM substrate 202. Due to highly variable flow and temperature conditions in the engine exhaust, however, the power or heating level used to maintain a desired sensor temperature during may vary significantly.

Referring briefly to FIG. 1, the controller 12 may receive input data from the PM sensor 200, process the input data, and trigger a response to the processed input data based on instruction or code programmed therein corresponding to one or more routines for controlling the PM sensor 200. Example control routines are described herein with reference to FIGS. 4-6.

It will be appreciated that PM sensor regeneration is different from particulate filter regeneration (e.g., PF regeneration). PM sensor regeneration particularly relates to regeneration of the sensor. In this way, the PM sensor is returned to a condition more suitable for relaying accurate information pertaining to the exhaust. Such information may include diagnostics that relate to the state of the PF, and thus, may at least in part determine if PF regeneration is warranted. Similar to the PM sensor regeneration described herein, PF regeneration is typically achieved by raising the temperature of the PF to a predetermined level, and ensuring that the exhaust gas entering the PF is of a certain composition.

As described above, the example PM sensor 200 shown in FIG. 2 may be a resistive sensor which accumulates a small amount of particulates on a ceramic substrate on which two non-reactive platinum electrodes separated by a small gap are printed. As particulates accumulate on the substrate 202, they bridge the gap 206 and cause the conductivity between the electrodes 204 to drop from the nearly zero conductivity of the ceramic substrate. The conductance between the electrodes is therefore an indication of the cumulative PM in the area of the exhaust the sensor measures.

Over time, carbon based particles (e.g., soot) and non-carbon based particles (e.g., contaminants such as oil additive materials, fuel contaminants, residual materials from the exhaust system such as iron oxide from exhaust manifolds and exhaust passages, material from catalytic and filter substrates, etc.) accumulate on the PM sensor 200. The non-carbon based particles may coat the PM sensor 200 resulting in decreased accuracy of the PM sensor 200 for outputting an indication of particulate flow rate through the particulate filter. This decreased accuracy may either increase a speed of the sensor response if the deposited materials are conductive or semiconductive, or the sensor response may be slowed if insulating particles are deposited. Thus, during a reduced contamination mode (FIG. 6) when the PM sensor 200 is no longer measuring the particulate flow rate through the particulate filter in a measurement mode (FIG. 5), the sensor is heated such that the sensor temperature is higher than that of the surrounding exhaust gas. As such, particulates will be repelled from the sensor via thermophoresis in which a kinetic energy difference drives particulates from a region of higher temperature to a region of lower temperature.

Figure 3:
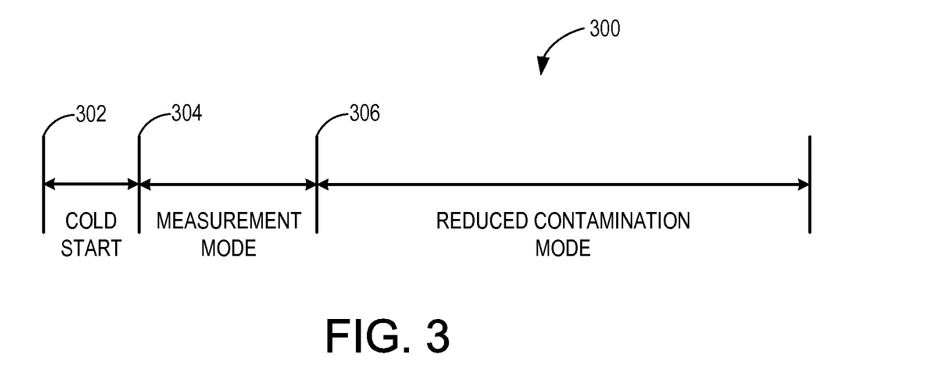
FIG. 3 shows a graph illustrating modes of operation of a particulate matter sensor over a drive cycle of an engine.

FIG. 3 shows a graph illustrating modes of operation of a particulate matter sensor, such as the particulate matter sensor 200 described above with reference to FIG. 2, over a drive cycle of an engine, such as the engine 10 described above with reference to FIG. 1. The drive cycle may begin at a time indicated at 302 when the engine is started, for example.

As depicted, the first part of the drive cycle includes a cold start. As referred to herein, "cold start" implies the engine is started under conditions in which the engine has cooled to ambient conditions, which may be relatively hot or cold. During the cold start, the PM sensor may be operated in a reduced contamination mode in which the PM sensor is heated very slightly, on the order of 100-200° C., at the electrodes to avoid the buildup of water droplets or condensate, and while being low enough to avoid the potential for thermal shock when large water droplets strike a heated surface. This operation is typical for many ceramic based exhaust gas sensors. In some examples, the PM sensor may be operated in the reduced contamination mode based on operating conditions of the system. For example, the PM sensor may be heated when an amount of condensate present in the exhaust system is greater than a threshold amount.

At a time indicated at 304, light-off of the sensor occurs. At this time, the PM sensor is warmed-up and ready for operation in a measurement mode. In the measurement mode, for example, the PM sensor may generate an indication of a particulate matter flow rate through a particulate filter positioned upstream of the PM sensor. In this way, the PM sensor may indicate degradation of the particulate filter and one or more engine operating parameters may be adjusted based on the output of the sensor, as will be described below with reference to FIG. 5.

At a time indicated at 306, the diagnostic of the particulate filter based on the PM sensor is completed and the PM sensor begins or resumes operation in the reduced contamination mode until the end of the drive cycle. During the reduced contamination mode, engine operating parameters are not adjusted based on the output of the PM sensor, as the sensor is repelling particulate from the sensing element. As depicted in the example of FIG. 3, once in reduced contamination mode, the sensor remains in reduced contamination mode until the end of the drive cycle when the vehicle shuts down. In other examples, the sensor may be switched back to operation in measurement mode, at least temporarily, if a diagnostic of the particulate filter is needed, for example.

Figure 4:
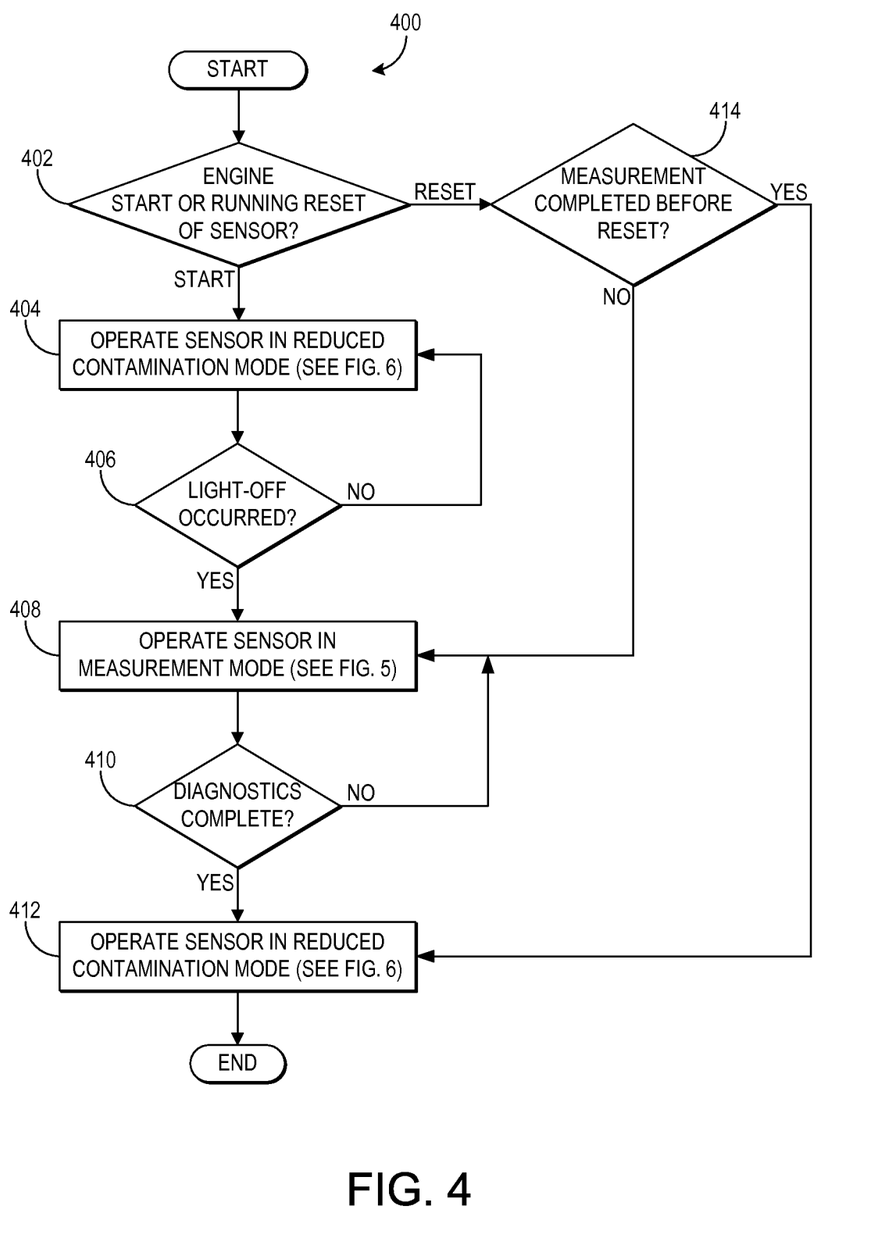
FIG. 4 shows a flow chart illustrating a routine for determining a mode of operation of a particulate matter sensor.
Figure 5:
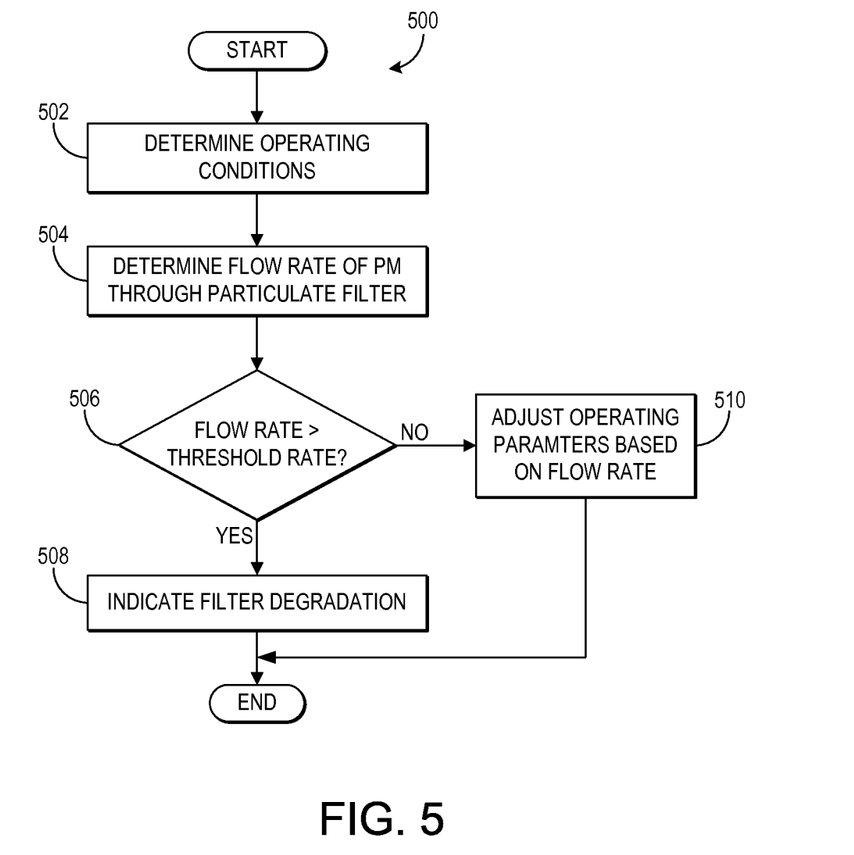
FIG. 5 shows a flow chart illustrating a routine for operating a particulate matter sensor in a measurement mode.
Figure 6:
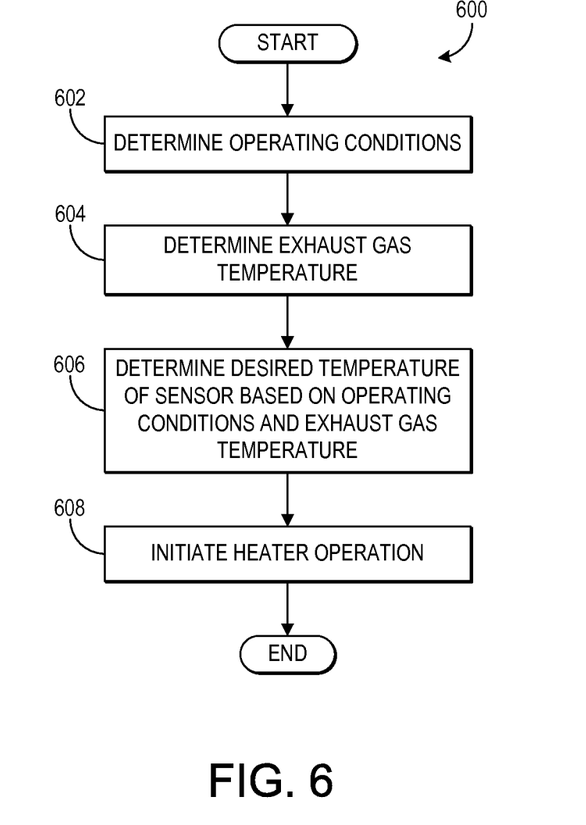
FIG. 6 shows a flow chart illustrating a routine for operating a particulate matter sensor in a reduced contamination mode.

FIGS. 4-6 show control routines for a PM sensor, such as the PM sensor 200 described above with reference to FIG. 2. FIG. 4 shows a flow chart illustrating a routine for determining a mode of operation of the PM sensor, such as the modes of operation shown in FIG. 3. FIG. 5 shows a flow chart illustrating a routine for operating the sensor in a measurement mode. FIG. 6 shows a flow chart illustrating a routine for operating the sensor in a reduced contamination mode.

Continuing to FIG. 4, a flow chart illustrating a control routine 400 for determining a mode of operation of a PM sensor is shown. In one example, the PM sensor may be the PM sensor 200 described above with reference to FIG. 2. Specifically, the routine 400 determines in which mode the sensor should be operated based on events throughout a drive cycle of an engine in a vehicle in which the sensor is disposed. For example, the mode of operation of the sensor may change responsive to light-off of the sensor and/or completion of a diagnostic test. The engine may be the engine 10 described above with reference to FIG. 1, for example.

At 402 of routine 400, it is determined if the engine is under a cold start or if a reset of the sensor has occurred while the engine is running. As described above, cold start implies the engine is started under conditions in which the engine has cooled to ambient conditions, which may be relatively hot or cold.

If it is determined that a reset of the sensor has occurred during engine running conditions, the routine 400 moves to 414 and it is determined if the sensor has completed measurements. If it is determined that measurements have not been completed, the routine moves to 408 where a measurement mode of operation is carried out, as described in greater detail below with reference to FIG. 5. If it is determined that the sensor has completed measurements, the routine moves to 412 where the sensor is operated in a reduced contamination mode of operation, as described in greater detail below with reference to FIG. 6.

On the other hand, if it is determined that the engine is under a cold start, the routine 400 continues to 404 and the sensor is operated in the reduced contamination mode, which is described in greater detail with reference to FIG. 6 below. In some examples, the sensor may always be operated in reduced contamination mode during a cold start. In other examples, whether to operate the sensor in reduced contamination mode during a cold start may depend on various parameters. In one example, the sensor may be operated in the reduced contamination mode when greater than a threshold level of condensate is present in the exhaust system. By operating the sensor in the reduced contamination mode during the cold start, the sensor may be placed in an operational condition that limits the ability of liquid droplets to form on the sensor, for example.

At 406 of routine 400, it is determined if light-off of the PM sensor has occurred. It may be determined that light-off of the sensor has occurred based on a temperature of the sensor (e.g., it is determined if exit criteria for dew point conditions have been reached). For example, once the sensor has warmed up to a threshold temperature, the sensor may operate with increased accuracy and a reduced chance of degradation.

If it is determined that light-off of the sensor has not occurred, the routine 400 returns to 404 where the sensor is operated in the reduced contamination mode. On the other hand, if it is determined that light-off has occurred, the routine 400 proceeds to 408 and the sensor is operated in measurement mode, which is described in greater detail with reference to FIG. 5 below. In measurement mode, the sensor is operated to measure an amount of particulate present in the exhaust gas stream. As such, the sensor may perform a diagnostic test on a particulate filter positioned upstream of the sensor, for example, based on the amount of particulate measured.

In some examples, the diagnostic test may be performed once during a drive cycle. For example, the diagnostic test may be performed immediately following a cold start, as shown in FIG. 3. In other examples, the diagnostic test may be performed multiple times throughout a drive cycle of the engine. For example, the measurement mode may be carried out if continuous operation of the vehicle in which the engine system is disposed is long enough to warrant another measurement. As examples, the measurement mode may be carried out based on a number of miles travelled, after a refueling event, or after a particulate filter regeneration.

At 410 of routine 400, it is determined if the diagnostics are complete. It may be determined that the diagnostics are complete if a controller, such as the controller 12 described above with reference to FIG. 1, indicates that the particulate filter is or is not degraded based on output from the PM sensor.

If the diagnostics are not complete, the sensor continues to operate in the measurement mode. On the other hand, if it is determined that the diagnostics are complete, the routine 400 continues to 412 and the sensor is operated in the reduced contamination mode.

FIG. 5 shows a control routine 500 illustrating the measurement mode of operation of the PM sensor. Specifically, the routine 500 determines operating conditions and diagnoses a particulate filter positioned upstream of the sensor based on output from the sensor. For example, degradation of the particulate filter may be indicated when the sensor generates a particulate flow rate that is greater than a threshold rate.

At 502 of routine 500, engine operating conditions are determined. Engine operating conditions may include but are not limited to air fuel ratio, engine fueling parameters, exhaust temperature, and the like, for example.

Once the operating conditions are determined, the routine 500 continues to 504 and a flow rate of particulate matter through the particulate filter is determined. As an example, the sensor may generate an indication of the particulate flow rate based on an amount of particulate which accumulates on a sensing element of the sensor over a period of time. The indication of particulate flow rate may be determined based on a resistance or current flow change during particulate accumulation on the sensing element of the sensor.

At 506, it is determined if the flow rate determined at 504 is greater than a threshold flow rate. The threshold flow rate may correspond to a flow of particulate through the particulate filter which occurs when the particulate filter is degraded, for example, and not performing effectively.

If it is determined that the flow rate is not greater than the threshold rate, the routine 500 moves to 510 and one or more operating parameters are adjusted based on the flow rate indicated by the sensor. The one or more operating parameters may include parameters such as air fuel ratio, fueling parameters, and the like. In one example, fueling of the engine may be adjusted based on the sensor. For example, if the particulate flow rate through the particulate filter is relatively high, an amount of fuel injected to the engine may be decreased.

On the other hand, if it is determined that the flow rate is greater than the threshold flow rate, the routine 500 proceeds to 508 and degradation of the filter is indicated. As an example, the control system may set a flag indicating degradation of the filter and an operator of the vehicle may be notified via a dashboard display.

Thus, the sensor may be operated in the measurement mode and a diagnostic test may be performed on the particulate filter early in the drive cycle such that the particulate filter may be repaired or replaced as soon as possible, for example. Further, operation of the engine may be adjusted based on the flow rate of particulate through the particulate filter such that there is an appropriate flow of particulates through the particulate filter. In some examples, the measurement mode may be carried out concurrently with the reduced contamination mode. In such an example, the flow rate may be indicated with a revised expectation for a duration of operation where the sensor defines a leaky particulate filter, for example.

FIG. 6 shows a flow chart illustrating a control routine 600 for operating sensor in a reduced contamination mode. Specifically, the routine determines sensor operating conditions and adjusts a sensor heater to increase a temperature of the sensor above that of the surrounding exhaust gas. In this way, contaminants, such as non-carbon based particulates, may be repelled from the sensor when it is not performing diagnostics on the particulate filter.

At 602 of routine 600, sensor operating conditions are determined. The sensor operating conditions may include exhaust gas temperature, exhaust gas pressure, sensor temperature, amount of condensate in the exhaust gas stream, and the like.

Once the sensor operating conditions are determined, the exhaust gas temperature is determined at 604. The exhaust gas temperature may be determined based on a temperature sensor, such as the exhaust temperature sensor 144 described above with reference to FIG. 1. The exhaust temperature sensor may be disposed slightly upstream or downstream of the particulate matter sensor such that the exhaust temperature in the vicinity of the particulate matter sensor is measured.

After the exhaust gas temperature is determined, the routine 600 continues to 606 and the desired temperature of the sensor is determined based on the sensor operating conditions and the exhaust gas temperature. For example, it may be desired to have the sensor temperature greater than the exhaust gas temperature but less than a temperature at which soot burns. As a non-limiting example, the desired difference in temperature between the sensor and the exhaust gas may be between 50 and 200° C.

In one example, the difference in temperature may be relatively small (e.g., 50° C.) because current temperature sensor is currently close to that at which soot will burn off the sensor. In another example, the desired temperature difference may be relatively small in order to reduce energy used by the sensor. In yet another example, the difference in temperature may be relatively large (e.g., 150° C.) due to an increasing exhaust gas temperature (e.g., during cold start).

Once the desired temperature is determined, the routine 600 continue to 608 and sensor heater operation is initiated such that the heater is turned on and a sensing element of the sensor is heated. In this way, the increased temperature is maintained greater than the exhaust gas temperature even as the exhaust gas temperature fluctuates with engine operating conditions.

Thus, the temperature of the particulate sensor may be controlled based on various sensor operating parameters in the reduced contamination mode of the sensor. By increasing the temperature of the sensor to a temperature higher than that of the surrounding exhaust gas, non-carbon based particulates (e.g., contaminants) may be repelled from the sensor and the sensor may be protected from degradation while the sensor is not being used for diagnosing the particulate filter. It should be noted, during the reduced contamination mode of particulate sensor operation, engine operating parameters are not adjusted based on the sensor, as the sensor may not be outputting a signal corresponding to particulate matter flow through the particulate filter.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for a particulate matter sensor, comprising:
   generating an indication of particulate flow rate through a particulate filter based on particulate accumulation on a sensing element of the sensor, and diagnosing the particulate filter based on the flow rate;
   responsive to determining that the diagnosing of the particulate filter is completed, heating the sensing element of the sensor to a first temperature greater than an exhaust gas temperature but lower than a temperature at which soot burns to repel particulate from the sensing element, and maintaining the sensing element of the sensor at the first temperature.

2. The method of claim 1, further comprising, while the sensing element is maintained at the first temperature greater than the exhaust gas temperature but lower than the temperature at which soot burns, repelling particulate from the sensing element, and
wherein generating the indication of particulate flow rate includes operating the sensor in a measurement mode.

3. The method of claim 2, further comprising adjusting one or more engine operating parameters based on the flow rate during the measurement mode.

4. The method of claim 3, wherein the one or more engine operating parameters includes engine fueling and air fuel ratio.

5. The method of claim 2, wherein the sensor is operated in the measurement mode only once per drive cycle of an engine to which the sensor is coupled in an exhaust passage thereof, and wherein, for each drive cycle of the engine, the sensing element is heated from the completion of the diagnosing of the particulate filter until the end of the drive cycle, the sensing element being maintained at the first temperature greater than the exhaust gas temperature but less than the temperature at which soot burns.

6. The method of claim 1, wherein heating the sensing element includes heating the sensor to the first temperature greater than the exhaust gas temperature, and maintaining it greater than the exhaust gas temperature even as the exhaust gas temperature fluctuates with engine operating conditions, but less than the temperature at which soot burns, and not diagnosing the particulate filter.

7. The method of claim 1, wherein heating the sensing element to repel particulate from the sensing element includes operating the sensor in a reduced contamination mode.

8. The method of claim 7, further comprising not adjusting one or more engine operating parameters based on the sensor during the reduced contamination mode.

9. The method of claim 1, wherein heating the sensing element of the sensor includes initiating operation of a sensor heater.

10. The method of claim 1, further comprising indicating degradation of the particulate filter based on the flow rate generated by the sensor.

11. A method, comprising:
during a drive cycle of an engine that begins with an engine start and ends with an engine shut down:
during a warm-up mode, increasing a sensor temperature to a first temperature greater than an exhaust gas temperature but lower than a temperature at which soot burns to repel particulate matter from a sensing element, maintaining the sensor temperature at the first temperature, and not adjusting engine operating parameters based on a particulate matter sensor until the sensor reaches light-off temperature, the warm-up mode occurring responsive to the engine start;
during a measurement mode, generating a particulate flow rate through a particulate filter based on particulate accumulation on the sensing element of the particulate matter sensor, and adjusting one or more engine operating parameters based on the sensor, at least one instance of the measurement mode occurring responsive to light-off of the particulate matter sensor after the engine start; and
during a reduced contamination mode, increasing the sensor temperature to a second temperature greater than the exhaust gas temperature but lower than the temperature at which soot burns to repel particulate matter from the sensing element, maintaining the sensor temperature at the second temperature, and not adjusting the engine operating parameters based on the sensor, the reduced contamination mode occurring responsive to completion of the measurement mode.

12. The method of claim 11, further comprising operating the sensor in the measurement mode only once during a drive cycle.

13. The method of claim 11, wherein the engine operating parameters include engine fueling and air fuel ratio, and
wherein, responsive to entering the reduced contamination mode, the sensor is maintained in the reduced contamination mode until an end of a drive cycle, the sensor temperature being maintained at the second temperature.

14. The method of claim 11, wherein increasing the sensor temperature includes increasing the sensor temperature to a temperature less than the temperature at which soot burns, and wherein, during the reduced contamination mode, the sensor does not output a signal corresponding to the particulate flow rate.

15. The method of claim 11, wherein a change in the sensor temperature due to the increase is based on one or more sensor operating parameters, and wherein the second temperature is greater than the first temperature.

16. The method of claim 11, further comprising, during the measurement mode, indicating degradation of the particulate filter when the particulate flow rate is greater than a threshold flow rate.

17. A system, comprising:
an engine with an exhaust system;
a particulate matter sensor disposed downstream of a particulate filter in the exhaust system, the particulate matter sensor including a heater and a sensing element exposed to an exhaust gas stream; and
an electronic control system in communication with the particulate matter sensor, the electronic control system including a storage medium storing non-transitory instructions to, during a measurement mode of a diagnostic test, generate a particulate flow rate through the particulate filter based on the particulate matter sensor, and adjust one or more engine operating parameters based on the particulate flow rate; and, during a reduced contamination mode of the diagnostic test, initiate operation of the heater to increase a sensor temperature to a first temperature greater than an exhaust gas temperature but lower than a temperature at which soot burns to repel particulate matter from the sensing element, maintain the sensor temperature at the first temperature until an engine shut-down event, and not adjust the engine operating parameters based on the sensor, the reduced contamination mode of the diagnostic test occurring after the measurement mode of the diagnostic test.

18. The system of claim 17, wherein the electronic control system further includes instructions to indicate degradation of the particulate filter based on the particulate flow rate, and wherein, during the reduced contamination mode, the sensor does not output a signal corresponding to the particulate flow rate.

19. The system of claim 17, further comprising an exhaust temperature sensor configured to output an exhaust gas temperature.

20. The system of claim 19, wherein the electronic control system further includes instructions to also operate in the reduced contamination mode of the diagnostic test prior to the measurement mode during a cold start of the engine, and wherein the electronic control system further includes instructions to increase the sensor temperature to a second temperature higher than the exhaust gas temperature, but less than the temperature at which soot burns during the cold start of the engine, the second temperature lower than the first temperature.

21. A method for a particulate matter sensor, comprising:
generating an indication of particulate flow rate through a particulate filter based on particulate accumulation on a sensing element of the sensor, and diagnosing the particulate filter based on the flow rate; and
responsive to determining that the diagnosing of the particulate filter is completed, heating the sensing element of the sensor to a temperature greater than an exhaust gas temperature but lower than a temperature at which soot burns to repel particulate from the sensing element;
wherein heating the sensing element includes heating the sensor to the temperature greater than the exhaust gas temperature, and maintaining it greater than the exhaust gas temperature even as the exhaust gas temperature fluctuates with engine operating conditions, but less than the temperature at which soot burns, and not diagnosing the particulate filter.

* * * * *